United States Patent
Iizaka et al.

(10) Patent No.: US 8,403,216 B2
(45) Date of Patent: Mar. 26, 2013

(54) CODE READING APPARATUS, SALES REGISTRATION PROCESSING APPARATUS, AND CODE READING METHOD

(75) Inventors: Hitoshi Iizaka, Shizuoka (JP); Yoshiya Yamada, Shizuoka (JP); Hidemi Mihara, Shizuoka (JP); Osamu Tsuchiya, Shizuoka (JP); Hidehiro Naito, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/005,673

(22) Filed: Jan. 13, 2011

(65) Prior Publication Data

US 2011/0180596 A1 Jul. 28, 2011

(30) Foreign Application Priority Data

Jan. 25, 2010 (JP) .................. 2010-013624

(51) Int. Cl.
*G06K 7/016* (2006.01)
(52) U.S. Cl. .................. 235/383; 235/375
(58) Field of Classification Search .................. 235/375, 235/383, 385, 462.01, 487
See application file for complete search history.

(56) References Cited

U.S. PATENT DOCUMENTS

2009/0250516 A1* 10/2009 Tsuchiya et al. .............. 235/383

FOREIGN PATENT DOCUMENTS

| JP | 04-306793 | 10/1992 |
|---|---|---|
| JP | 11-250351 | 9/1999 |
| JP | 2003-331361 | 11/2003 |
| JP | 2008-033640 | 2/2008 |
| JP | 2009-271916 | 11/2009 |

OTHER PUBLICATIONS

Japanese Office Action for Japanese Application No. 2010-013624 mailed on Dec. 20, 2011.

* cited by examiner

*Primary Examiner* — Thien M Le
*Assistant Examiner* — Christle Marshall
(74) *Attorney, Agent, or Firm* — Turocy & Watson, LLP (57) ABSTRACT

According to one embodiment, a code reading apparatus includes an image capturing unit, a first reading unit, a second reading unit and an information output unit. The image capturing unit captures an image picked up by an imaging unit. The first reading unit detects one of an image of a code symbol and an image of benefit indication from the image captured by the image capturing unit and reads commodity information corresponding to the code symbol or benefit information corresponding to the benefit indication from the detected image. The second reading unit causes, for a predetermined time after the first reading unit reads the information, until the first reading unit detects the other image not detected yet, the image capturing unit to capture the image and reads, if the first reading unit detects the other image, one of the commodity information and the benefit information from the detected other image. The information output unit outputs the information read by the second reading unit together with the information read by the first reading unit.

10 Claims, 11 Drawing Sheets

| No | LABEL CHARACTERISTIC DATA | BENEFIT INFORMATION |
|---|---|---|
| 1 | 0.5, US$, OFF | -US$ 0.5 |
| 2 | 10, %, OFF | -10 % |
| 3 | 10, POINT | +10 P |
| ⋮ | ⋮ | ⋮ |

CODE READING APPARATUS, SALES REGISTRATION PROCESSING APPARATUS, AND CODE READING METHOD

CROSS-REFERENCE TO RELATED APPLICATION

This application is based upon and claims the benefit of priority from the prior Japanese Patent Application No. 2010-013624, filed on Jan. 25, 2010; the entire contents of which are incorporated herein by reference.

FIELD

Embodiments described herein relate generally to a code reading apparatus, a sales registration processing apparatus, and a code reading method.

BACKGROUND

In the past, in retail stores such as a supermarket, to reduce a disposal loss of fresh food, commodities are often sold at a discount as store closing time approaches. In this case, a store attaches discount labels indicating discount amounts, discount rates, or the like to the commodities to clearly display to customers that the commodities are discounted commodities. If a discount label is attached to a commodity about to be purchased by a customer, an operator of a point of sales (POS) terminal reads a barcode of the commodity with a scanner and performs processing concerning a discount from a keyboard, a touch panel, or the like. Therefore, it is likely that the operator sells the discounted commodity at a normal price without noticing the discount label.

On the other hand, JP-A-2008-33640 discloses a scanner. The scanner simultaneously picks up images of a barcode and a discount label with a camera if the barcode and the discount label are present in the same imaging area. The scanner outputs a commodity code and discount information read from the picked-up image to a POS terminal. The POS terminal automatically performs discount according to the received commodity code and discount information.

In the technique described in JP-A-2008-33640, since images of the discount label and the barcode are picked up at a time, the discount label needs to be attached near the barcode. However, since the discount label is often manually attached by a store clerk, in some cases, the positions of the barcode and the discount label are spaced apart from each other. In such a case, since the camera cannot pick up images of the barcode and the discount label at a time, discount processing cannot be automatically performed. An operator performs the discount processing by manually inputting the discount information from a keyboard or the like.

DETAILED DESCRIPTION

In general, according to one embodiment, a code reading apparatus includes an image capturing unit, a first reading unit, a second reading unit and an information output unit. The image capturing unit captures an image picked up by an imaging unit. The first reading unit detects one of an image of a code symbol and an image of benefit indication from the image captured by the image capturing unit and reads commodity information corresponding to the code symbol or benefit information corresponding to the benefit indication from the detected image. The second reading unit causes, for a predetermined time after the first reading unit reads the information, until the first reading unit detects the other image not detected yet, the image capturing unit to capture the image and reads, if the first reading unit detects the other image, one of the commodity information the benefit information from the detected other image. The information output unit outputs the information read by the second reading unit together with the information read by the first reading unit.

According to another embodiment, a code reading method includes: an image capturing unit capturing an image picked up by an imaging unit; a first reading unit detecting one of an image of a code symbol and an image of benefit indication from the image captured by the image capturing unit and reading commodity information corresponding to the code symbol or benefit information corresponding to benefit indication from the detected image; a second reading unit causing, for a predetermined time after the first reading unit reads the information, until the first reading unit detects the other image not detected, the image capturing unit to capture the image and reading, if the first reading unit detects the other image, one of the commodity information and the benefit information from the detected other image; and an information output unit outputting the information read by the second reading unit together with the information read by the first reading unit.

According to still another embodiment, a sales registration processing apparatus performs sales registration for a commodity using the commodity information and the benefit information output by the code reading apparatus according to the embodiment.

The sales registration processing apparatus according to the embodiment is suitable as a POS terminal used in a supermarket or a convenience store. The code reading apparatus according to the embodiment is suitable as a code reading apparatus or a barcode reader connected to the POS terminal and used.

First Embodiment

Figure 1:
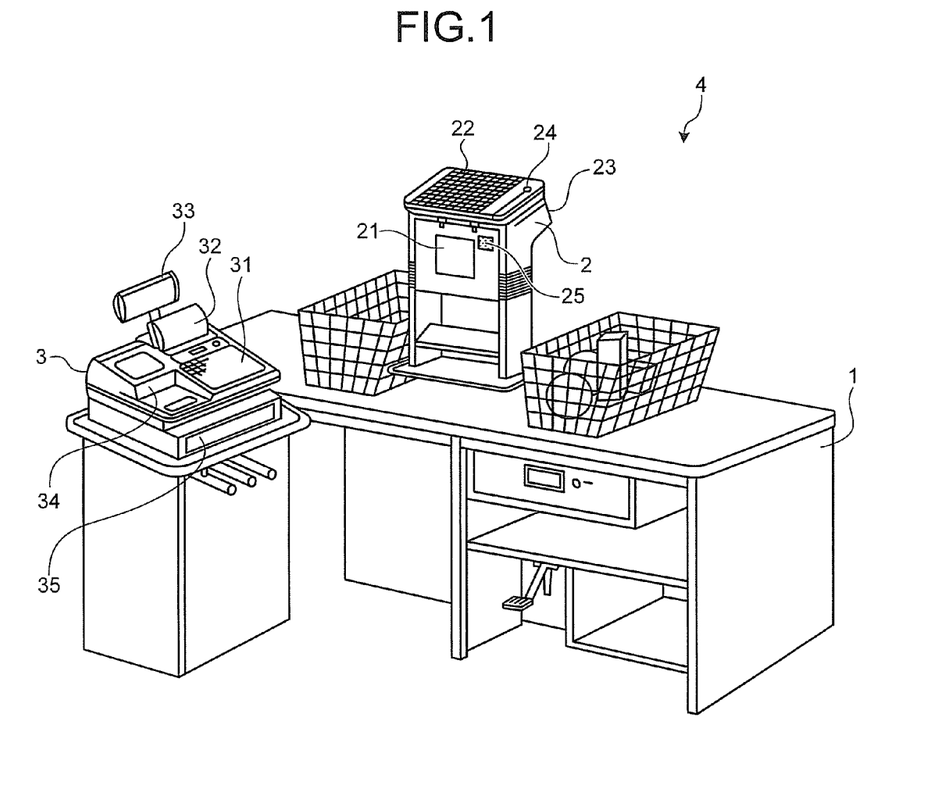
FIG. 1 is a schematic external perspective view of the configuration of a checkout lane system according to a first embodiment.

FIG. 1 is a schematic perspective view of the configuration of a checkout lane system 4 according to a first embodiment. As shown in FIG. 1, the checkout lane system 4 includes a sucker table 1 for placing a shopping basket including commodities, a code reading apparatus 2 vertically provided substantially in the center of the sucker table 1, and a POS terminal 3 connected to the code reading apparatus by a not-shown transmission line to be capable of communicating with each other.

The POS terminal 3 performs sales registration for commodities to be purchased by a customer. As shown in FIG. 1, the POS terminal 3 includes a keyboard 31, an operator display 32, a customer display 33, a printer 34 configured to perform receipt printing and the like, and a drawer 35 for storing cash and the like. A closing key and the like necessary for settlement of a commodity price are disposed on the keyboard 31. The POS terminal 3 has components and functions same as those of a POS terminal typically used in the checkout lane system of this type.

The code reading apparatus 2 reads a barcode attached to a commodity. The code reading apparatus 2 outputs commodity information included in the barcode to the POS terminal 3. As shown in FIG. 1, the code reading apparatus 2 mainly includes a reading window 21, a keyboard 22, a display 23, a display LED 24, and a buzzer 25.

The keyboard 22 receives input by various keys if registration of a commodity that cannot be registered by using a barcode is performed. The display 23 displays a name, a price, and the like of a registered commodity to a customer. If the barcode attached to the commodity is read, the display LED 24 is turned on to notify an operator that the barcode is read. If the barcode attached to the commodity is read, the buzzer 25 emits buzzer sound to notify the operator that the barcode is read. A charge coupled device (CCD) camera 20 (see FIG. 2) is incorporated on the inside of the code reading apparatus 2 including the reading window 21. The CCD camera 20 is hereinafter simply referred to as camera 20.

Figure 2:
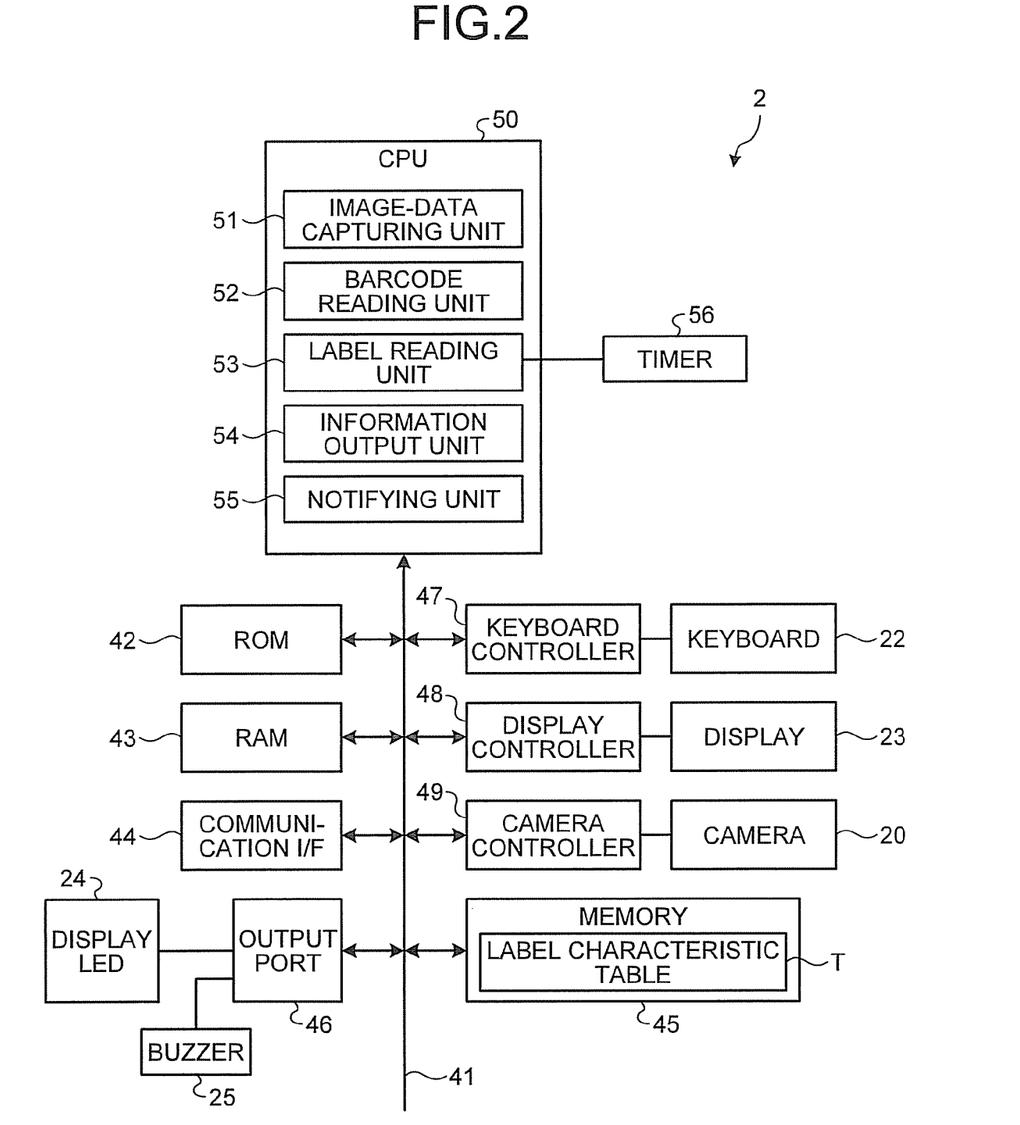
FIG. 2 is a block diagram of the configuration of a code reading apparatus.

FIG. 2 is a block diagram of the configuration of the code reading apparatus 2. The code reading apparatus 2 mainly includes a CPU 50, a ROM 42, a RAM 43, a communication I/F 44, an output port 46, a keyboard controller 47, a display controller 48, a camera controller 49, and a memory 45. The CPU 50, the ROM 42, the RAM 43, the communication I/F 44, the output port 46, the keyboard controller 47, the display controller 48, the camera controller 49, and the memory 45 are connected by a bus line 41 such as an address bus or a data bus.

The CPU 50 functions as a control unit configured to control the entire operation of the code reading apparatus 2. The ROM 42 stores a computer program according to this embodiment and other computer programs and the like for controlling the operation of the CPU 50. The RAM 43 functions as a work area when the CPU 50 expands the various computer programs stored by the ROM 42. The RAM 43 stores various data such as image data picked up by the camera 20.

The communication I/F 44 controls data communication with the POS terminal 3 (see FIG. 1) connected via a bus. The output port 46 outputs a driving signal to the buzzer 25 and athe display LED 24. The keyboard controller 47 captures a key signal from the keyboard 22. The display controller 48 controls data display on the display 23. The camera controller 49 controls an imaging operation of the camera 20.

The camera 20 picks up an image of a code symbol such as a barcode or a two-dimensional code attached to a commodity or a label indicating a benefit such as a discount or point addition.

Figure 3:
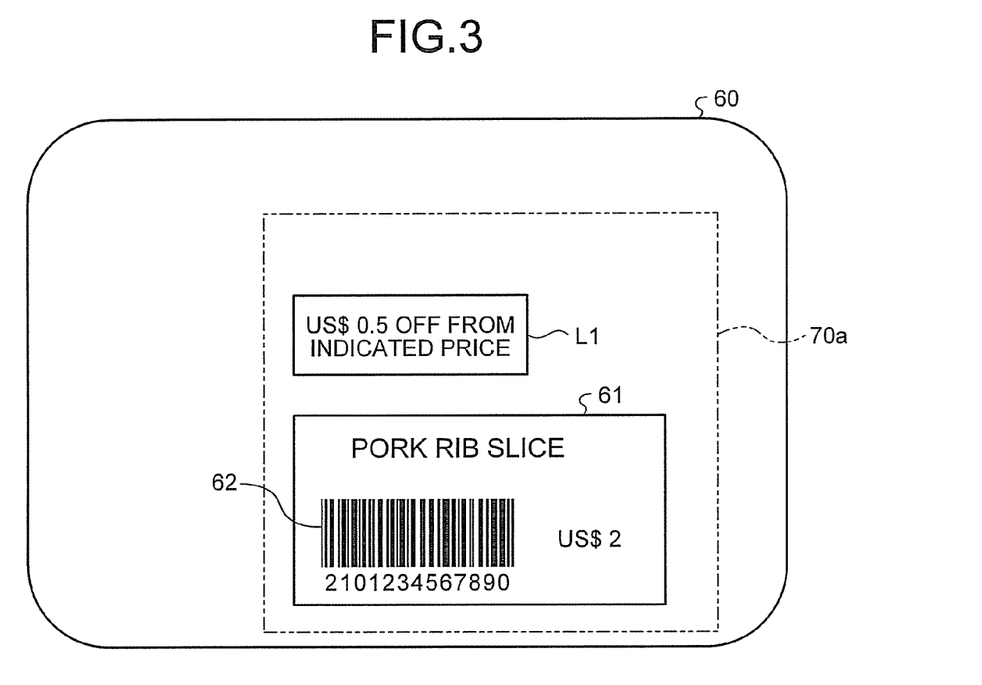
FIG. 3 is a diagram of an example of a relation between a commodity and an imaging area of a camera.

A relation between a commodity and an imaging area of the camera 20 processed by the code reading apparatus 2 according to this embodiment is explained below. FIG. 3 is a diagram of an example of a relation between a commodity 60 and the imaging area of the camera 20. An area surrounded by an alternate long and two short dashes line in the figure is an imaging area 70a, which is an area where the camera 20 can pick up images in one frame. A discount label L1 as an example of a benefit indication label is attached to the commodity 60 shown in FIG. 3 in addition to a barcode label 61.

A commodity name "pork rib slice", a commodity price "US$ 2", a barcode 62, and the like are shown on the barcode label 61. Information such as a commodity code is incorporated in the barcode 62 as commodity information necessary for subjecting sales data of the commodity 60 to registration processing in the POS terminal 3. A commodity code "2101234567890" incorporated in the barcode 62 is shown as a number under the barcode 62. Character information "US$ 0.5 off from the indicated price" indicating a discount amount concerning the commodity 60 is shown on the discount label L1.

Figure 4:
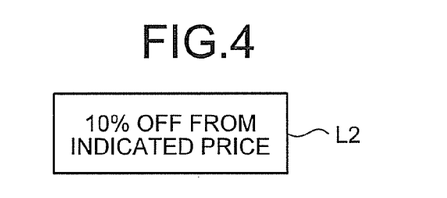
FIG. 4 is a diagram of a discount label.
Figure 5:
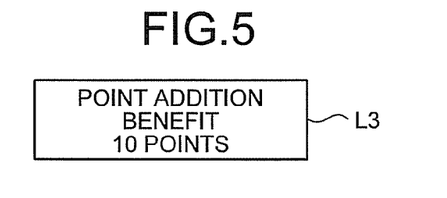
FIG. 5 is a diagram of a point addition label.

The benefit indication label has to be a label that is attached to the commodity 60 and indicates a benefit granted when the commodity 60 is purchased. Other examples of the benefit indication label include a discount label L2 indicating a discount rate of the commodity 60 as shown in FIG. 4 and a point addition label L3 indicating the number of points granted to a customer who purchases the commodity 60 in addition to the usual number of granted points as shown in FIG. 5

The nonvolatile memory 45 stores a label characteristic table T that associates characteristics of the benefit indication label and content of a benefit indicated by the benefit indication label.

Figure 6:
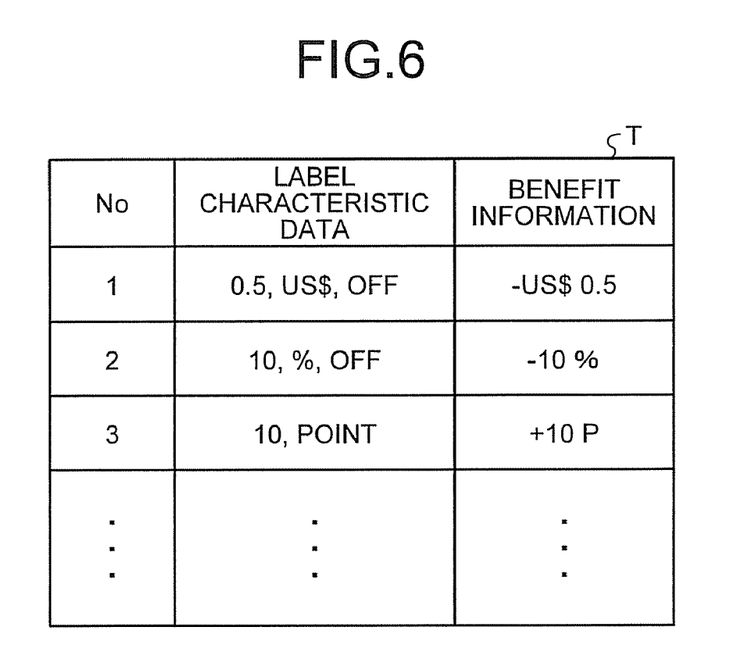
FIG. 6 is a diagram for explaining a label characteristic table.
Figure 7:
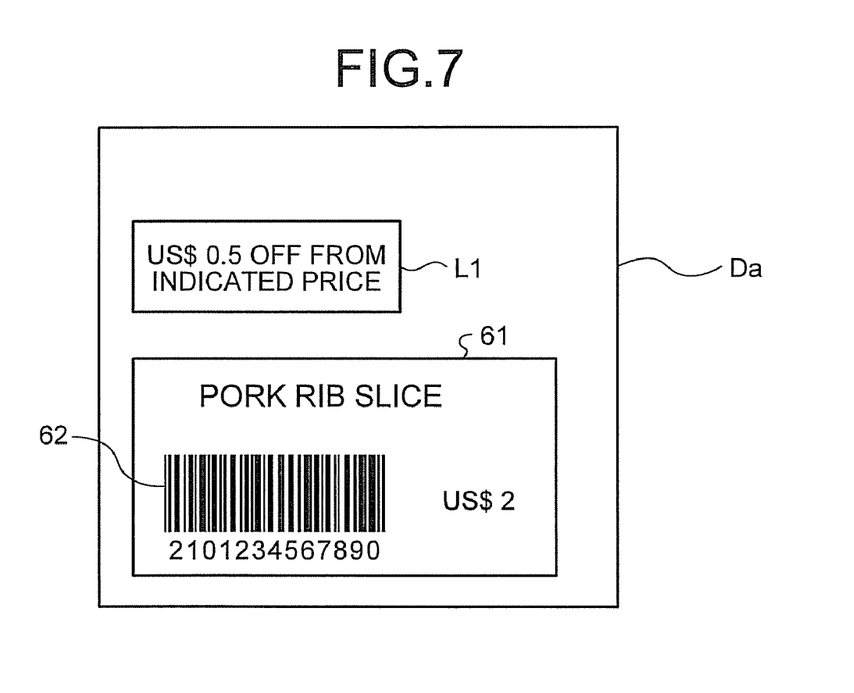
FIG. 7 is a diagram of image data including a barcode label and a discount label.

FIG. 6 is a diagram for explaining the label characteristic table T. As shown in FIG. 6, the label characteristic table T stores, in association with each other, label characteristic data indicating characteristics such as characters or a symbol included in the benefit indication label and benefit information granted to a commodity by the benefit indication label.

More specifically, the label characteristic data is information extracted from the benefit indication label by character recognition processing of an OCR or the like. Concerning the discount label L1 on which "US$ 0.5 off from the indicated price" is written as shown in FIG. 3, information "0.5, US$, off" is extracted by the character recognition processing as indicated by label characteristic data No. 1 in the label characteristic table T shown in FIG. 6. Similarly, concerning labels L2 and L3 shown in FIGS. 4 and 5, information concerning a discount and point granting "10, %, off" and "10, point" is extracted as indicated by label characteristic data No. 2 and No. 3 shown in FIG. 6.

The benefit information means information obtained by converting information concerning a benefit such as discount information or point granting information read from the benefit indication label into an alphanumerical value such that the information can be used in sales registration processing of the POS terminal 3. Specifically, as shown in FIG. 6, benefit information "-US$ 0.5" meaning a discount of US$ 0.5 is stored in association with the label characteristic data "0.5, US$, off". Benefit information "-10%" meaning a discount of 10% is stored in association with the label characteristic data "10, %, off". Benefit information "+10P" meaning point addition of 10 points is stored in association with the label characteristic data "10, point".

Characteristic functions of the code reading apparatus 2 according to this embodiment are explained below. The CPU 50 operates according to the computer programs stored in the ROM 42 and expanded in the RAM 43 to function as an image-data capturing unit 51, a barcode reading unit 52, a label reading unit 53, an information output unit 54, and a notifying unit 55, as shown in FIG. 2.

The image-data capturing unit 51 outputs an imaging ON signal to the camera controller 49 and causes the camera 20 to start an imaging operation. The image-data capturing unit 51 captures image data present in the imaging area 70a, 70b, 70c picked up by the camera 20 and stores the image data in an image work area of the RAM 43. If instructed by the label reading unit 53, the image-data capturing unit 51 captures image data present in the imaging area 70a, 70b, 70c picked up by the camera 20 and stores the image data in the image work area of the RAM 43.

Image data D (Da, Db, and Dc) captured by the image-data capturing unit 51 is explained with reference to FIG. 3 and FIGS. 7 to 10.

As shown in FIG. 3, if the barcode 62 and the discount label L1 are attached close to each other on the commodity 60, the barcode 62 and the discount label L1 fit in the imaging area 70a. In this case, the camera 20 can pick up images of the barcode 62 and the discount label L1 in one frame. The image-data capturing unit 51 stores the image data Da (see FIG. 7) corresponding to the imaging area 70a in the image work area of the RAM 43.

Figure 8:
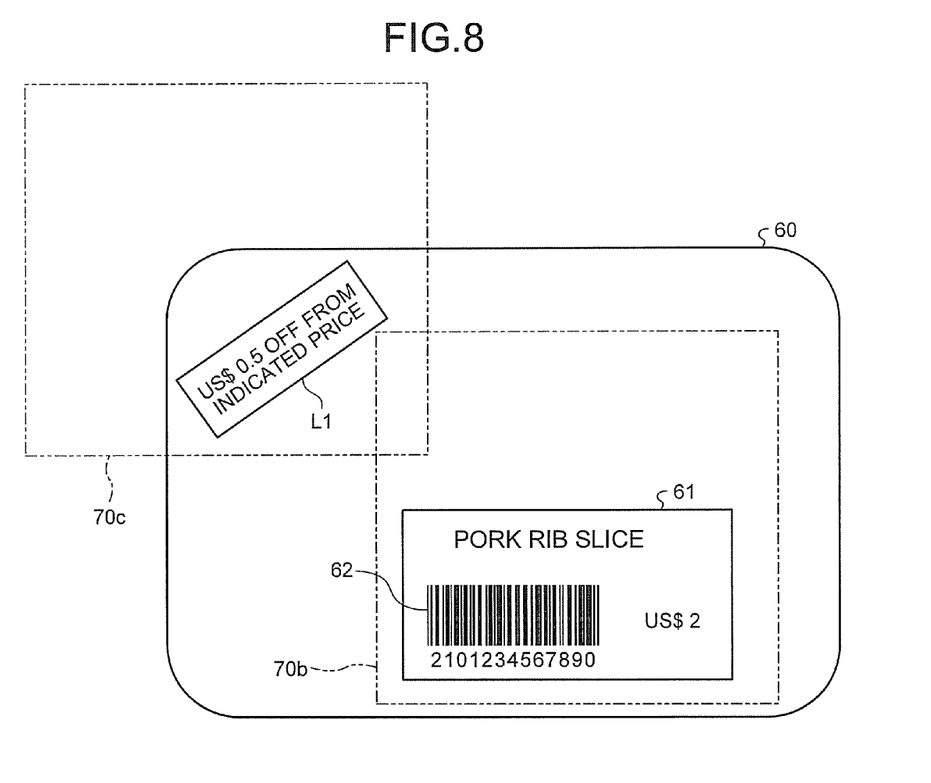
FIG. 8 is a diagram of an example of a relation between the barcode label and discount label and the imaging area.
Figure 9:
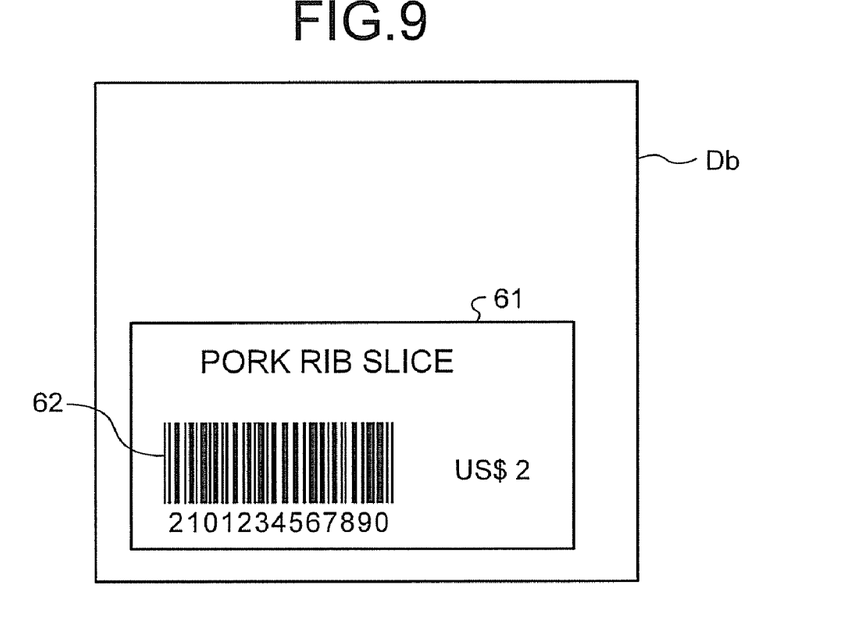
FIG. 9 is a diagram of image data including the barcode label.
Figure 10:
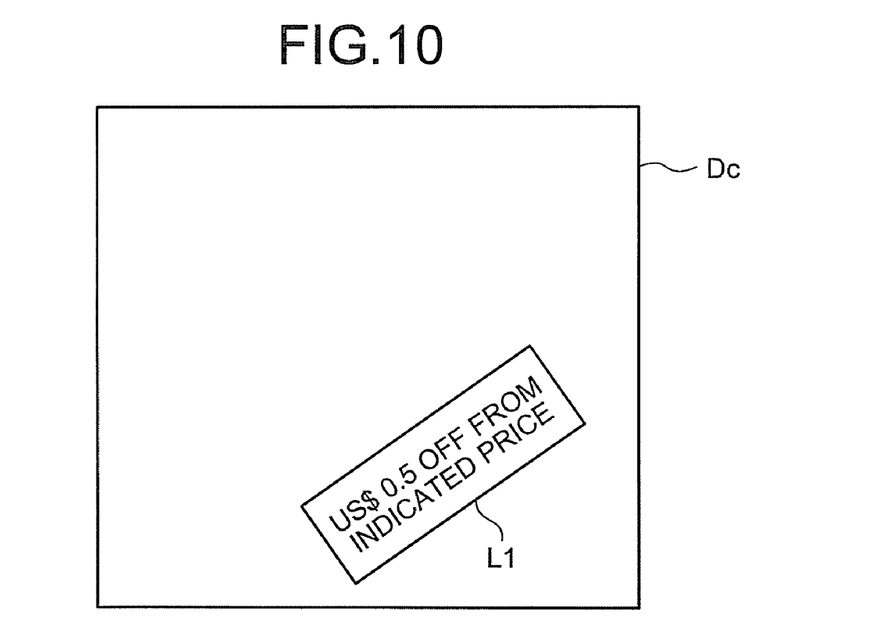
FIG. 10 is a diagram of image data including the discount label.

On the other hand, as shown in FIG. 8, if the barcode 62 and the discount label L1 are attached away from each other on the commodity 60, the barcode 62 and the discount label L1 do not fit in the same imaging area 70a. In this case, the operator changes the position of the commodity 60 held over the reading window 21. The operator picks up images of the commodity 60 dividedly plural times in plural frames of an imaging area 70b including the barcode 62 and an imaging area 70c including the discount label L1. The image-data capturing unit 51 captures the image data Db (see FIG. 9) and the image data Dc (see FIG. 10) respectively corresponding to the imaging areas 70b and 70c and stores the image data in the image work area of the RAM 43.

The barcode reading unit 52 detects an image of the barcode 62 from the image data stored in the image work area of the RAM 43 by the image-data capturing unit 51. The barcode reading unit 52 performs barcode reading processing for reading commodity information of the commodity 60 from the detected barcode 62.

Figure 11:
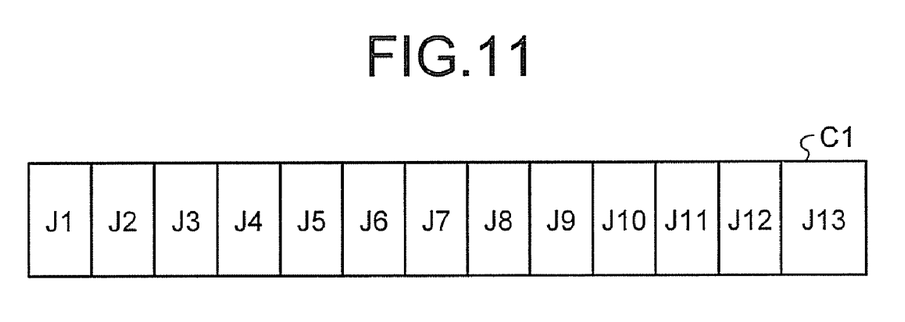
FIG. 11 is a diagram for explaining barcode data.

More specifically, the barcode reading unit 52 binarizes the image data D (Da to Dc, see FIGS. 7, 9, and 10) of one frame stored in the image work area of the RAM 43. The barcode reading unit 52 detects whether a data area concerning the barcode 62 is present in the binarized data. If the barcode reading unit 52 detects the data area concerning the barcode 62 in the captured image data D, the barcode reading unit 52 decodes the barcode 62 and reads, as the commodity information of the commodity 60, barcode data (JAN code) C1 of J1 to J13 shown in FIG. 11. The barcode data C1 includes a manufacturer code, a commodity code as commodity information, and a check digit. The barcode reading unit 52 stores the read barcode C1 in a barcode work area of the RAM 43.

The label reading unit 53 applies label reading processing for detecting an image of a benefit indication label to the image data stored in the image work area of the RAM 43 by the image-data capturing unit 51. The label reading unit 53 performs capturing of image data by the image-data capturing unit 51 for a predetermined time set in advance until an image of the benefit indication label is detected. If the label reading unit 53 detects an image of the benefit indication label within the predetermined time, the label reading unit 53 reads benefit information (see FIG. 6) from the detected image of the benefit indication label.

More specifically, the label reading unit 53 applies character recognition processing of an optical character reader (OCR) or the like to the image data D (Da to Dc, see FIGS. 7, 9, and 10) of one frame stored in the image work area of the RAM 43. The label reading unit 53 collates characteristics such as characters, a picture, or a symbol included in the benefit indication label and the label characteristic data (see FIG. 6) of the label characteristic table T. If the label reading unit 53 detects label characteristic data having a high degree of coincidence, the label reading unit 53 determines that the benefit indication label is detected in the image data D.

The label reading unit 53 reads benefit information corresponding to the detected label characteristic data from the label characteristic table T. The label reading unit 53 encodes the read benefit information to generate a benefit code C2 (see FIG. 12) and stores the benefit code C2 in the benefit code work area of the RAM 43.

Figure 12:
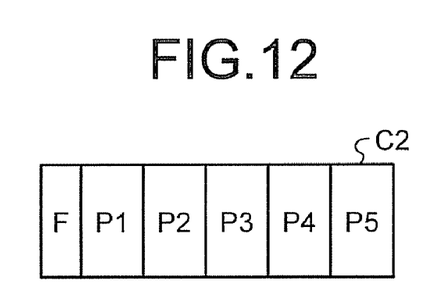
FIG. 12 is a diagram for explaining a benefit code.

FIG. 12 is a diagram for explaining the benefit code C2. As shown in FIG. 12, the benefit code C2 includes a flag F for setting a type of a benefit and data P1 to P5 indicating values of benefits to be provided such as a discount amount, a discount rate, and the number of granted points. The flag F can represent, for example, a type of a benefit with 1 representing a discount rate, 2 representing a discount amount, and 3 representing points.

The label reading unit 53 controls the operation of a timer 56 for limiting time of the label reading processing. If a benefit indication label is not detected and if the timer 56 does not time out, the label reading unit 53 instructs the image-data capturing unit 51 to perform image capturing. In other words, the label reading unit 53 causes the image-data capturing unit 51 to capture anew image data present in the imaging area 70a picked up by the camera 20.

In this way, the operator can pick up images of the commodity 60 plural times with the camera 20 for a predetermined time in which the timer 56 does not time out. Therefore, even if a benefit indication label is not attached to the imaging area 70b including the barcode label 61 as shown in FIG. 8, the operator can pick up an image again in the imaging area 70c including the benefit indication label and can acquire the barcode data C1 and the benefit code C2.

If the benefit code C2 generated by the label reading unit 53 is stored in the RAM 43, the information output unit generates a composite code C3. In other words, the information output unit 54 combines the barcode data C1 stored in the RAM 43 and the benefit code C2 to generate the composite code C3. The information output unit 54 outputs the composite code C3 to the POS terminal 3.

If the benefit code C2 is not stored in the RAM 43, the information output unit 54 outputs only the barcode data C1 to the POS terminal 3.

The POS terminal 3 receives the barcode data C1 or the composite code C3 output by the information output unit 54. The POS terminal 3 performs sales registration for the commodity 60 using the received barcode data C1. The POS terminal 3 puts a discount on the commodity 60 according to the received composite code C3 and performs the sales registration for the commodity 60.

Figure 13:
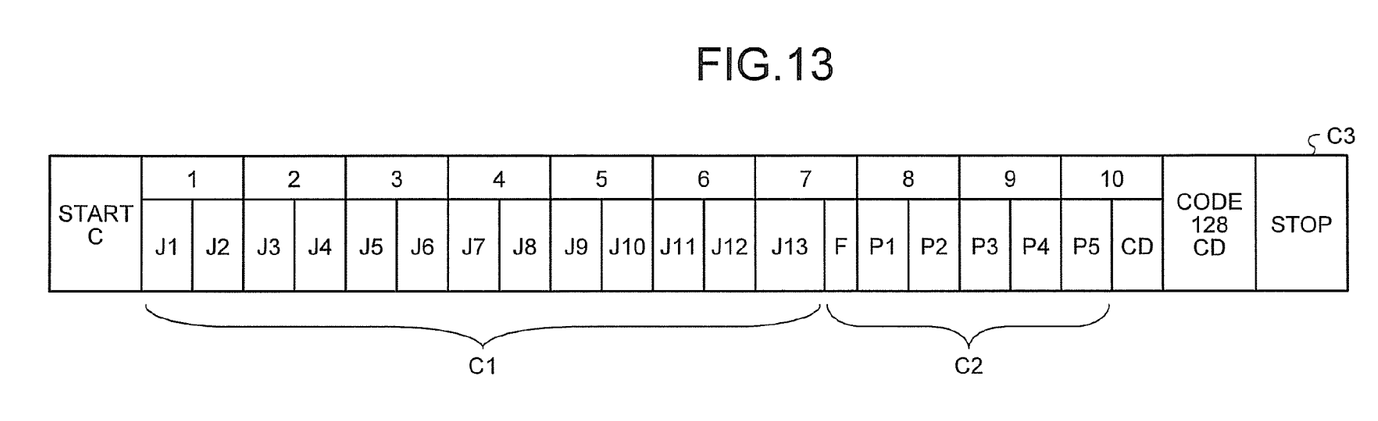
FIG. 13 is a diagram for explaining a composite code.

FIG. 13 is a diagram for explaining the composite code C3. As shown in FIG. 13, the composite code C3 is a code beginning with a start code, including the barcode data C1, the benefit code C2, a check digit CD of the benefit code C2, and a check digit CODE 128 CD of the composite code C3, and ending with a stop code. The POS terminal 3 grants a benefit indicated by the benefit code C2 to the commodity 60 and performs the sales registration on the basis of the composite code C3 received from the code reading apparatus 2.

As an example, as shown in FIG. 3, the discount label L1 for US$ 0.5 off is attached to the commodity 60. The label reading unit 53 digitizes read benefit information "-US$ 0.5" and generates the benefit code C2. Therefore, the composite code C3 includes the barcode data C1 corresponding to the commodity code "2101234567890" and the benefit code C2 corresponding to "-US$ 0.5". The POS terminal 3 refers to a commodity master or the like stored by the POS terminal 3 or a host terminal (not shown) in the store and reads the price of the commodity 60 corresponding to the barcode data C1. Further, the POS terminal 3 discounts US$ 0.5 from the read price and performs sales registration for the commodity 60.

If the barcode reading unit 52 reads the barcode 62, the notifying unit 55 outputs a barcode ON signal and causes the display LED 24 to emit light. Consequently, the notifying unit 55 notifies the operator that the barcode 62 is detected. If the information output unit 54 outputs the composite code C3 to the POS terminal 3, the notifying unit 55 outputs a barcode OFF signal to turn off the display LED 24. Alternatively, if the information output unit 54 outputs the barcode data C1, the notifying unit 55 outputs the barcode OFF signal and turn off the display LED 24.

Further, if the information output unit 54 outputs the barcode data C1 to the POS terminal 3, the notifying unit 55 drives the buzzer 25 to emit first buzzer sound (e.g., "peep") that indicates that only the barcode label 61 is read and a benefit indication label is not read.

If the information output unit 54 outputs the composite data C3 to the POS terminal 3, the notifying unit 55 drives the buzzer 25 to emit second buzzer sound (e.g., "peep peep") that indicates that both the barcode label 61 and a benefit indication label are read.

Figure 14:
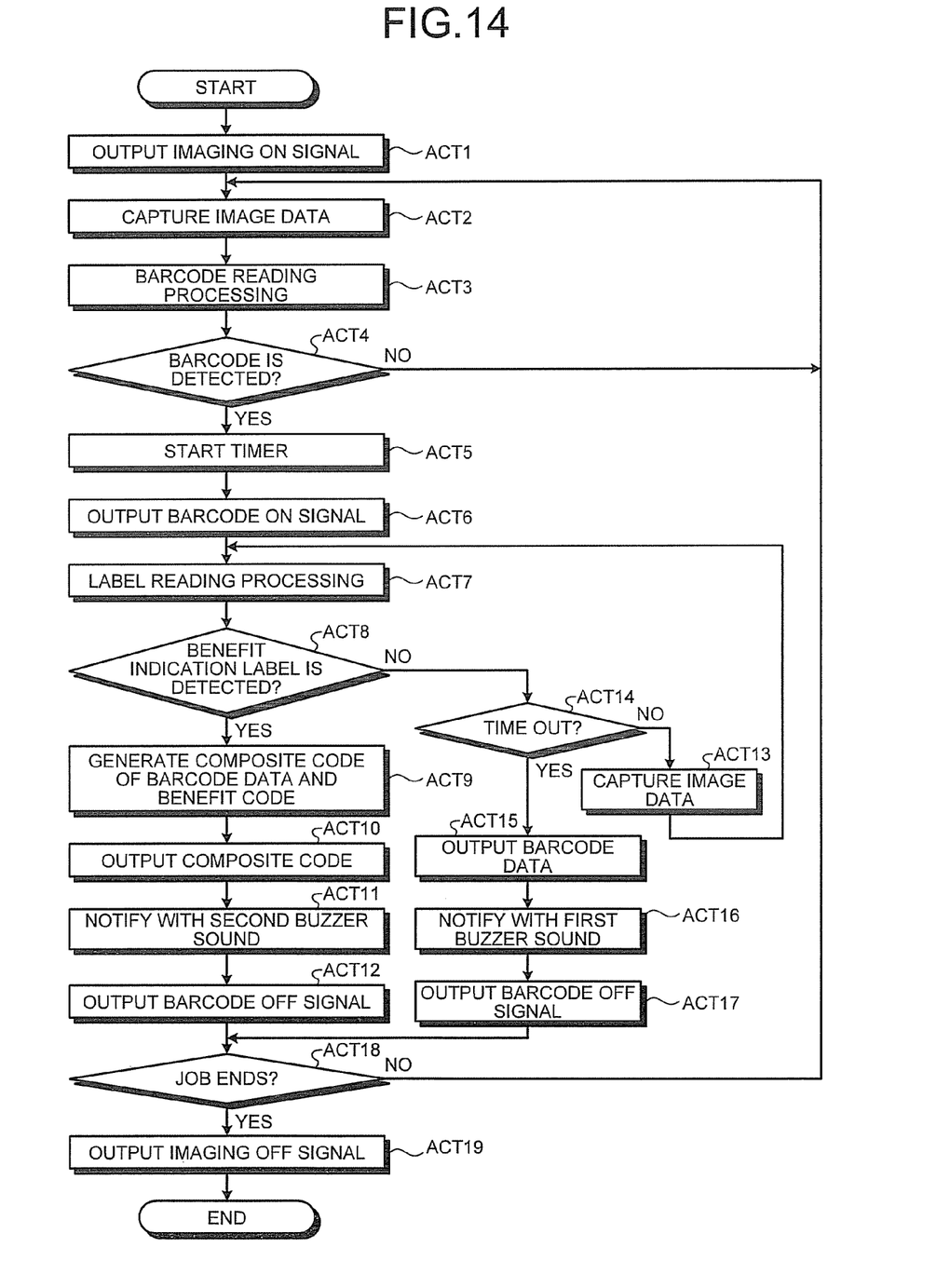
FIG. 14 is a flowchart for explaining a procedure of information output processing executed by the code reading apparatus.

Information output processing performed by the code reading apparatus 2 is explained below with reference to FIG. 14. FIG. 14 is a flowchart for explaining a procedure of the information output processing performed by the code reading apparatus 2.

If the start of a job is instructed by a command from the POS terminal 3, the CPU 50 of the code reading apparatus 2 starts the information output processing. The image-data capturing unit 51 outputs an imaging ON signal to the camera controller 49 and starts an imaging operation by the camera 20 (Act 1).

The image-data capturing unit 51 captures the image data D (Da, Db, and Dc) picked up by the camera 20 into the image work area of the RAM 43 (Act 2). The barcode reading unit 52 starts the barcode reading processing (Act 3).

The barcode reading unit 52 determines whether the barcode 62 is detected in the barcode reading processing in Act 3 (Act 4). If the barcode 62 is not detected (No in Act 4), the barcode reading unit 52 continues the imaging by the camera 20 (Act 2).

If the barcode 62 is detected (Yes in Act 4), the label reading unit 53 starts the timer 56 for limiting time of the label reading processing (Act 5). The notifying unit 55 outputs the barcode ON signal to turn on the display LED 24 (Act 6) and notifies the operator that the barcode 62 is detected.

Subsequently, the label reading unit 53 starts the label reading processing applied to the image data captured into the image work area of the RAM 43 in Act 2 (Act 7). The label reading unit 53 determines whether a benefit indication label is detected in the label reading processing in Act 7 (Act 8).

If a benefit indication label is detected (Yes in Act 8), the information output unit 54 generates the composite code C3 (see FIG. 13) from the barcode data C1 stored in the barcode work area of the RAM 43 and the benefit code C2 stored in the benefit code work area of the RAM 43 (Act 9). The information output unit 54 outputs and transmits the generated composite code C3 to the POS terminal 3 via the communication interface 44 (Act 10). The notifying unit 55 drives the buzzer 25 to emit the second buzzer sound (Act 11). Further, the notifying unit 55 outputs the barcode OFF signal to turn off a display such as an LED that notifies the operator that the barcode 62 is read (Act 12).

Thereafter, the CPU 50 determines whether the end of the job is instructed by a command from the POS terminal 3 (Act 18). If the end of the job is not instructed (No in Act 18), the CPU 50 returns to Act 2 and repeats Acts 2 to 18 until the sales registration for all commodities ends. If the end of the job is instructed (Yes in Act 18), the CPU 50 outputs an imaging OFF signal to the camera controller 49 (Act 19) and ends the imaging operation by the camera 20.

On the other hand, if a benefit indication label is not detected (No in Act 8), the label reading unit 53 determines whether the timer 56 started in Act 5 times out (Act 14).

If the timer 56 does not time out (No in Act 14), the label reading unit 53 controls the image-data capturing unit 51 to perform capturing of image data anew (Act 13). The label reading unit 53 executes the label reading processing on an image captured anew (Act 7).

If the timer 56 times out (Yes in Act 14), the information output unit 54 outputs and transmits the barcode data C1 stored in the barcode work area of the RAM 43 to the POS terminal 3 via the communication interface 44 (Act 15). The notifying unit 55 drives the buzzer 25 to emit the first buzzer sound (Act 16). The notifying unit 55 outputs the barcode OFF signal to turn off the display such as the LED that notifies the operator that the barcode 62 is read (Act 17). Thereafter, the CPU 50 shifts to Act 18.

As explained above, the code reading apparatus 2 provides a waiting time for the predetermined time to read a benefit indication label. During the predetermined time, the code reading apparatus 2 receives new image data picked up by the camera 20 until a benefit indication label is read. Consequently, even if the camera 20 cannot pick up an image of the barcode 62 and a benefit indication label in one frame, it is possible to acquire the barcode data C1 and the benefit code data C2 by picking up images of the commodity 60 plural times. Therefore, it is possible to automatically perform benefit granting processing such as discount processing or point addition processing without requiring discount processing by the operator.

As explained above, the notifying unit 55 notifies, by changing a tone and the number of times of the buzzer sound, the operator that both the barcode label 61 and a benefit indication label are read or that only the barcode label 61 is read. Therefore, the operator can easily discriminate, according to the difference in the buzzer sound, whether the commodity 60 is a commodity to which a benefit indication label is attached. Therefore, if benefit granting such as the discount processing or the point addition is automatically performed by the POS terminal 3, there is an effect that check work by the operator can also be easily performed.

Second Embodiment

Examples of a main commodity as a target of discount include fresh food processed and sold in a store. In general, as a commodity code attached to a commodity processed and sold in a store, an in-store code beginning with a specific numerical value (in this embodiment, 2) is used. Referring to FIG. 3, the commodity code "2101234567890" begins with "2". Therefore, the an in-store code is attached to the commodity 60.

In the first embodiment, reading of a benefit indication label is waited for the predetermined time after the barcode reading processing is applied to all the commodities. However, for example, in a store that applies discount sales to only commodities attached with in-store codes, reading of a benefit indication label has to be waited only for the commodities attached with the in-store codes.

Therefore, a code reading apparatus 202 according to a second embodiment determines whether a read commodity code is an in-store code. If the read commodity code is not an in-store code, the code reading apparatus 202 instantaneously outputs only the barcode data C1 to the POS terminal 3.

Figure 15:
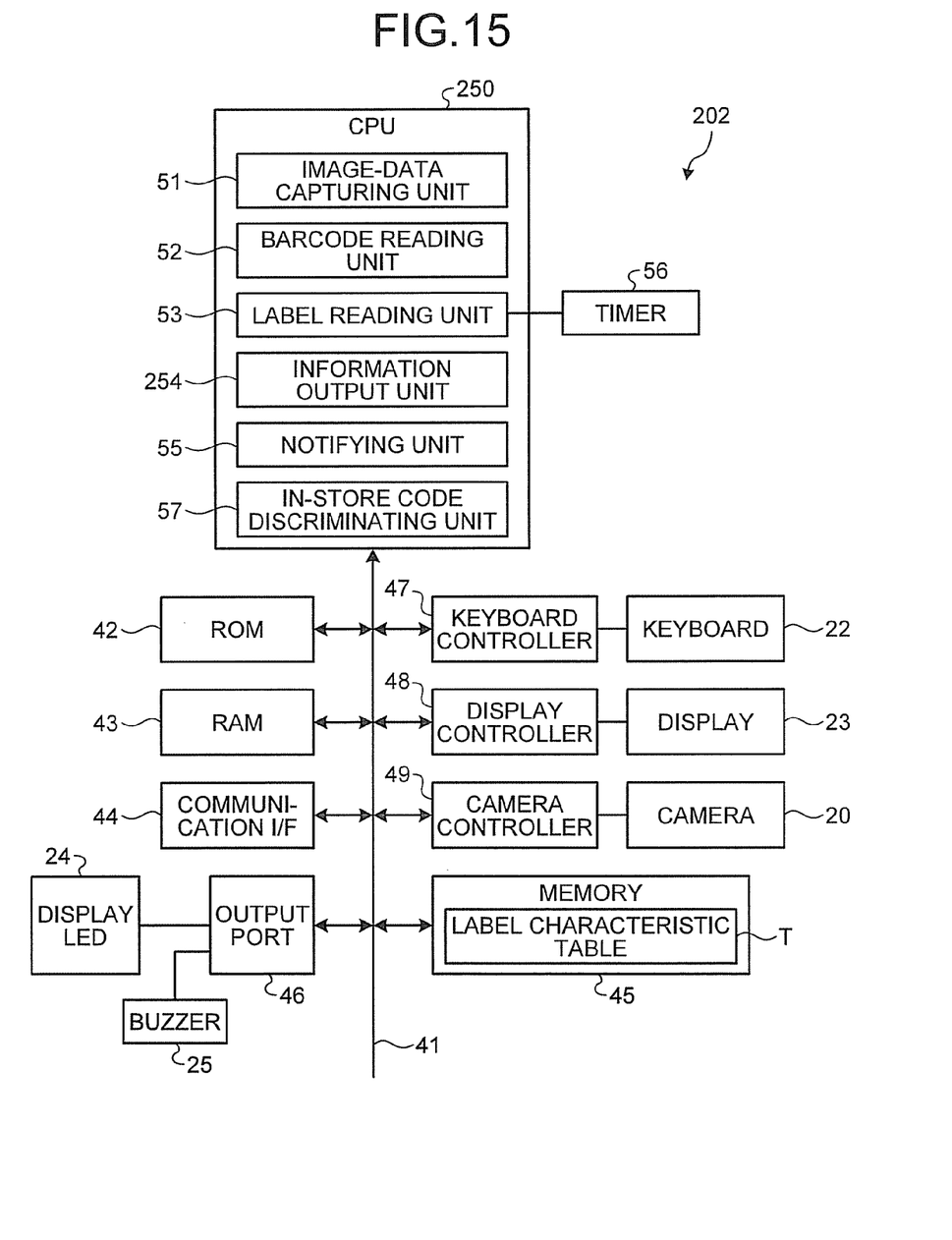
FIG. 15 is a block diagram of the configuration of a code reading apparatus according to a second embodiment.

FIG. 15 is a block diagram of the configuration of the code reading apparatus 202 according to the second embodiment. A CPU 250 of the code reading apparatus 202 further includes an in-store code discriminating unit 57 in addition to the units of the code reading apparatus 2 according to the first embodiment. The CPU 250 includes an information output unit 254 different from the information output unit 54 of the code reading apparatus 2 according to the first embodiment. Components same as those of the code reading apparatus 2 according to the first embodiment are denoted by the same reference numerals and signs and explanation of the components is omitted.

The in-store code discriminating unit 57 refers to the barcode data C1 (see FIG. 11) read by the barcode reading unit 52 and discriminates whether a commodity code indicated by the barcode data C1 begins with a specific numerical value indicating that the commodity code is an in-store code (benefit target information). For example, if the specific numerical value is set as "2" and the commodity code indicated by the barcode data C1 begins with "2" like "2101234567890", the in-store code discriminating unit 57 discriminates that the read barcode data C1 is an in-store code.

If the in-store code discriminating unit 57 discriminates that the barcode data C1 read by the barcode reading unit 52 is not an in-store code, the information output unit 254 instantaneously outputs only the barcode data C1 stored in the RAM 43 to the POS terminal 3 without waiting for reading of a benefit indication label for a predetermined time.

Figure 16:
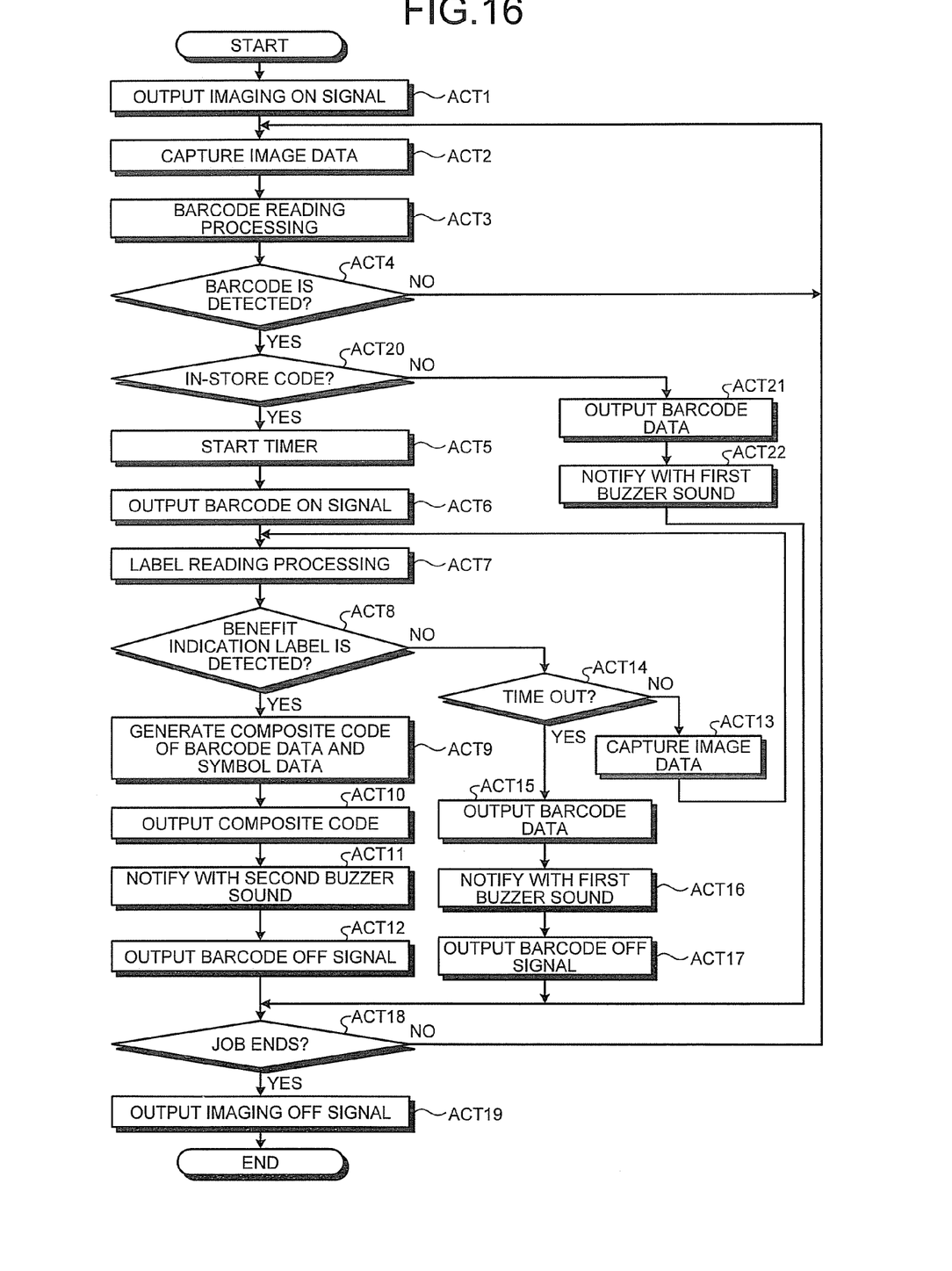
FIG. 16 is a flowchart for explaining a procedure of information output processing executed by the code reading apparatus.

Information output processing executed by the code reading apparatus 202 is explained below with reference to FIG. 16. FIG. 16 is a flowchart for explaining a procedure of the information output processing executed by the code reading apparatus 202. Kinds of processing same as those shown in FIG. 14 are denoted by the same reference signs and explanation of the processing is omitted.

The in-store code discriminating unit 57 discriminates whether the barcode 62 read in Act 3 is an in-store code (Act 20). If the in-store code discriminating unit 57 discriminates that the barcode 62 is an in-store code (Yes in Act 20), the CPU 250 shifts to Act 5 and performs the processing in Act 5 described above and subsequent acts. On the other hand, if the in-store code discriminating unit 57 discriminates that the barcode 62 is not an in-store code (No in Act 20), the information output unit 254 outputs the barcode data C1 stored in the barcode work area of the RAM 43 to the POS terminal 3 via the communication interface 44 (Act 21). The notifying unit 55 drives the buzzer 25 to emit the first buzzer sound that indicates that the barcode 62 is read (Act 22). The CPU 250 shifts to Act 18.

As explained above, the code reading apparatus 202 discriminates from the read barcode 62 whether there is possibility of a discount. The code reading apparatus 202 waits for reading of a benefit indication label concerning only a commodity that has possibility of a discount. Therefore, since a waiting time for reading of a benefit indication label does not have to be provided for all commodities, it is possible to finish sales registration processing for commodities in a shorter time.

In the example explained above, one benefit indication label is attached to the commodity 60. However, plural benefit indication labels may be attached to the commodity 60. In this case, the label reading unit 53 detects images of the plural benefit indication labels. The label reading unit 53 reads benefit information corresponding to benefit indications respectively from the detected images of the benefit indication labels. The information output unit 54 or 254 combines the barcode data C1 and plural benefit codes C2 read from the benefit indication labels to generate the composite code C3.

In the above explanation, the label reading unit 53 reads benefit information from a benefit indication label. However, information concerning a discount, a price cut, or the like is not limited to a form of printing on a label. As other examples, the information concerning a price cut, a discount, or the like may be directly written or printed on the commodity 60. The label reading unit 53 is not limited to the identification processing for character information. The label reading unit 53 may identify the color, the size, the shape, and the like of a label, a figure, or the like and read benefit information associated with the characteristics.

In the above explanation, the barcode reading unit 52 reads the barcode 62 attached to the commodity 60. However, the barcode reading unit 52 is not limited to this. The barcode reading unit 52 may read a two-dimensional code such as a code symbol. In the above explanation, the barcode 62 is attached to the commodity 60 by the barcode label 61. However, the barcode 62 may be directly printed on the commodity 60.

The code reading apparatus 2 may include plural imaging units (cameras 20). For example, the code reading apparatus 2 may include a first imaging unit and a second imaging unit. In this case, the barcode reading unit 52 detects an image of a code symbol from an image picked up by the first imaging unit. The label reading unit 53 detects an image of benefit indication from an image picked up by the second imaging unit.

In the above explanation, the barcode reading unit 52 reads the commodity information (the barcode data C1) from the barcode 62 and then the label reading unit 53 reads the benefit information from the benefit indication label. However, order of reading information is not limited to this. As another example, it is also possible that, after the label reading unit 53 reads the benefit information from the benefit indication label, the barcode reading unit 52 reads the commodity information from the barcode 62.

Computer programs executed in the code reading apparatus 2 and 202 according to the embodiments are provided while being incorporated in the ROM 42 or the like in advance. The computer programs executed in the code reading apparatuses 2 and 202 according to the embodiments may be provided while being recorded in a computer-readable recording medium such as a CD-ROM, a flexible disk (FD), a CD-R, a digital versatile disk (DVD), or the like as a file of an installable format or an executable format.

The computer programs executed in the code reading apparatuses 2 and 202 according to the embodiments may be stored on a computer connected to a network such as the Internet and provided by being downloaded through the network. The computer programs executed in the code reading apparatuses 2 and 202 according to the embodiments may be provided or distributed through the network such as the Internet.

The present invention is not limited to the embodiments per se. In an implementation stage, it is possible to modify and embody the elements without departing from the spirit of the present invention. It is possible to form various inventions according to appropriate combinations of the plural elements disclosed in the embodiments. For example, several elements may be deleted from all the elements disclosed in the embodiments. The embodiments disclosed in the different embodiments may be combined.

As explained above, the code reading apparatuses 2 and 202 according to the embodiments perform, for the predetermined time after one of commodity information and benefit information is read, capturing of an image of the commodity information or the benefit information by the imaging unit until the other image not detected yet is detected. Therefore, even if attaching positions of a barcode and a discount label are apart from each other, the operator can pick up an image of a commodity again. Consequently, it is possible to automatically perform discount processing without requiring discount processing operation by the operator.

What is claimed is:

1. A code reading apparatus comprising:
an image capturing unit configured to capture an image picked up by an imaging unit;
a first reading unit configured to detect one of an image of a code symbol and an image of benefit indication from the image captured by the image capturing unit and read commodity information corresponding to the code symbol or benefit information corresponding to the benefit indication from the detected image;
a timer configured to time a predetermined time;
a first determination unit configured to determine whether another one of the image of the code symbol and the image of benefit indication, not detected yet by the first reading unit, is detected;
a second determination unit configured to determine whether the predetermined time is elapsed;
a second reading unit configured to cause, until the predetermined time is elapsed after the first reading unit reads the one of the commodity information and the benefit information, until detecting the other image not detected yet, the image capturing unit to capture the image and read, if the other image is detected, the other of the commodity information and the benefit information from the detected other image; and
an information output unit configured to output the information read by the second reading unit together with the information read by the first reading unit.

2. The apparatus according to claim 1, further comprising a notifying unit configured to notify, if one of the commodity information and the benefit information is read by the first reading unit or the second reading unit, until the information is output by the information output unit, that one of the commodity information and the benefit information is read.

3. The apparatus according to claim 2, wherein the notifying unit performs the notification by causing a light emitting unit to emit light.

4. The apparatus according to claim 1, wherein the first reading unit or the second reading unit reads the benefit information from character information included in the benefit indication.

5. The apparatus according to claim 1, further comprising a discriminating unit configured to discriminate whether the code symbol includes benefit target information that indicates that a commodity is a target commodity to which the benefit is granted, wherein
the first reading unit detects the image of the code symbol and reads the commodity information corresponding to the code symbol from the detected image, and
the information output unit outputs, if the benefit target information is not included in the commodity information read by the first reading unit, the commodity information read by the first reading unit without performing the detection of the other image by the second reading unit.

6. The apparatus according to claim 1, wherein
the apparatus includes a first imaging unit and a second imaging unit as the imaging unit,
the first reading unit detects, from an image picked up by the first imaging unit, one of the image of the code symbol and the image of the benefit indication, and
the second reading unit detects, from an image picked up by the second imaging unit, the other image not detected by the first reading unit.

7. The apparatus according to claim 1, wherein
one of the first reading unit and the second reading unit detects plural images of the benefit indication and reads the benefit information corresponding to the benefit indication from each of the images of the benefit indication, and
the information output unit outputs plural kinds of the read benefit information together with the commodity information.

8. The apparatus according to claim 1, wherein
one of the first reading unit and the second reading unit decodes the image of the code symbol and reads code data corresponding to the commodity information,
the other of the first reading unit and the second reading unit generates a benefit code corresponding to the benefit information read from the image of the benefit indication, and
the information output unit combines the code data and the benefit code to generate a composite code and outputs the composite code.

9. A sales registration processing apparatus that performs sales registration for a commodity using the commodity information and the benefit information output by the apparatus according to claim 1.

10. A code reading method comprising:
an image capturing unit capturing an image picked up by an imaging unit;
a first reading unit detecting one of an image of a code symbol and an image of benefit indication from the image captured by the image capturing unit and reading commodity information corresponding to the code symbol or benefit information corresponding to benefit indication from the detected image;
timing, by a timer, a predetermined time;
determining, by a first determination unit, whether another one of the image of the code symbol and the image of benefit indication, not previously detected, is detected;
determining, by a second determination unit, whether the predetermined time is elapsed;
a second reading unit causing, until the predetermined time is elapsed after the first reading unit reads the one of the commodity information and the benefit information, until detecting the other image not previously detected, the image capturing unit to capture the image and reading, if the other image is detected, the other of the commodity information and the benefit information from the detected other image; and
an information output unit outputting the information read by the second reading unit together with the information read by the first reading unit.

* * * * *